United States Patent Office 2,912,443
Patented Nov. 10, 1959

2,912,443
PREGNENETHIOLS

Raymond M. Dodson, Park Ridge, and Paul B. Sollman, Skokie, Ill., assignors to G. D. Searle & Co., Chicago, Ill., a corporation of Delaware No Drawing. Application September 14, 1956
Serial No. 609,800

8 Claims. (Cl. 260—397.3)

The present invention relates to steroidal mercaptans and to acyl derivatives thereof. It is specifically concerned with 3,20-dioxo-4-pregnene-16-thiols and acyl derivatives thereof of the structural formula

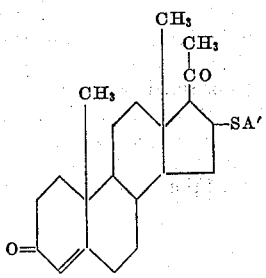

with 3-hydroxy-20-oxo-5-pregnene-16-thiols and acyl derivatives thereof of the structural formula

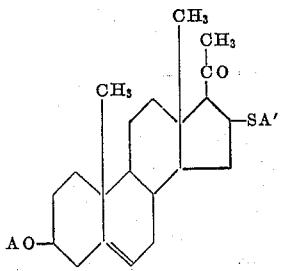

and with methods whereby 16-thiols of the pregnane series can be prepared by the reaction of hydrogen sulfide with pregnane derivatives nuclearly-unsaturated at position 16.

In the foregoing structural formulas A and A' can represent hydrogen or lower alkanoyl radicals such as formyl, acetyl, propionyl, butyryl, valeryl, hexanoyl, heptanoyl, octanoyl, and branched-chain isomers thereof, said lower alkanoyl radicals being the acyl radicals of alkanoic acids containing fewer than 9 carbon atoms.

Although certain steroidal sulfides of the prior art have been prepared by the reaction of 16-pregnene derivatives with an appropriate mercaptan, such as benzyl mercaptan, prior to the present invention no practical methods have been known for the preparation of 16-thiols of the pregnane series. It has now been found that such compounds can be prepared by the reaction of hydrogen sulfide with a 16-pregnen-20-one, whereby hydrogen sulfide adds to the double bond at position 16—17 with the attachment of the thiol group to position 16.

As an example of the way in which this procedure is applied to the manufacture of one of the compounds of this invention, 3β-acetoxy-5,16-pregnadien-20-one in an organic solvent is treated with hydrogen sulfide in the presence of a basic catalyst. Considerable latitude is possible in the selection of the organic solvent and the basic catalyst. For example, one can employ a pyridine solution with a small amount of piperidine as a catalyst, or a solution in a lower alkanol such as ethanol with an inorganic base such as potassium hydroxide as a catalyst. The resulting 16-thiol derivative can be isolated from the mixture by procedures described hereinafter.

The addition of hydrogen sulfide to the 16—17 double bond proceeds stereospecifically with the predominant formation of the stereochemically stable isomer. This stable isomer is the one in which the acetyl group at position 17 has the β-configuration, as does the natural hormone progesterone, and the thiol group at position 16 has the α-configuration.

Other esters of this invention are obtained by employing as a starting material the corresponding ester of 3β-hydroxy-5,16-pregnadien-20-one. Alkaline hydrolysis of a 3β-acyloxy-20-oxo-5-pregnene-16-thiol followed by acidification of the reaction mixture yields 3β-hydroxy-20-oxo-5-pregnene-16-thiol.

Oxidation of 3β-hydroxy-20-oxo-5-pregnene-16-thiol, suitably by heating it with a solution of aluminum isopropoxide and cyclohexanone in toluene, affords 3,20-dioxo-4-pregnene-16-thiol, another valuable compound of this invention.

Acylthio compositions comprehended within the scope of this invention can be manufactured by the direct acylation of the corresponding mercaptan, for example by employing a reaction mixture comprising the mercaptan, a lower alkanoic acid anhydride and pyridine. The acylthio compounds can also be obtained by the addition of thioalkanoic acids to pregnane derivatives nuclearly-unsaturated at position 16. While this type of addition, like the previously-described addition of hydrogen sulfide, proceeds under steric influences, it has been found possible to isolate, in varying amounts, a majority of the theoretically possible stereoisomers in the case of the addition of a thioalkanoic acid. Thus, the addition of thioacetic acid to 3β-acetoxy-5,16-pregnadien-20-one, which can optionally be carried out under the influence of ultraviolet light, affords at least three of the four possible stereoisomers of 3β-acetoxy-16-acetylthio-5-pregnen-20-one which are representable by the following partial formulas comprising steroidal ring D,

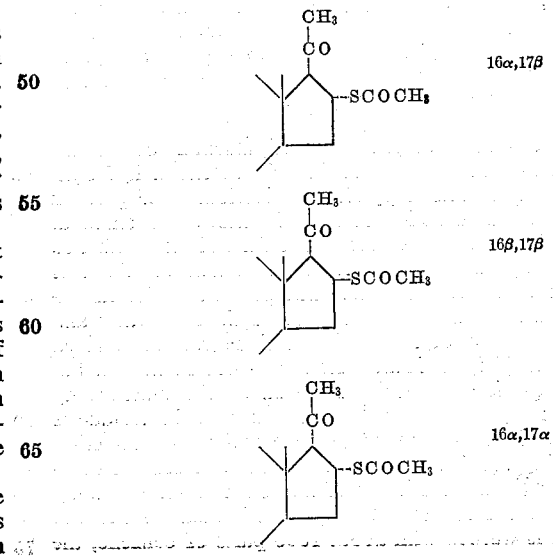

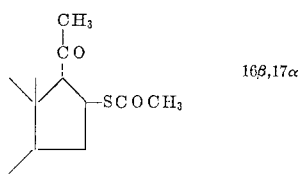

16β,17α

The particular isomers described hereinafter are designated as stereoisomers A, B, and C. Stereoisomer A, melting point about 186–187° C., formed in relatively large amount, is the 16α,17β-isomer; it is the same isomer that results from the direct acetylation of the mercaptan formed in predominant amount by the addition of hydrogen sulfide to the corresponding 16-pregnene derivative. Stereoisomer B, melting point about 168–169° C., is also formed in relatively large amount, and is converted to the relatively more stable stereoisomer A by isomerization in a refluxing solution of sodium acetate in acetic acid. Stereoisomer C, which is formed in relatively small amount, is a highly levorotatory compound. Except as otherwise specified, structural formulas appearing herein are not intended to express configurational distinctions, the structural formula

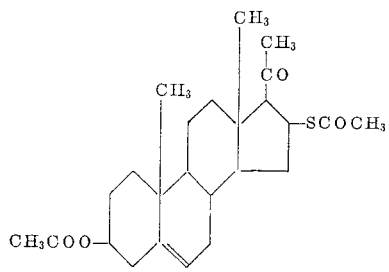

for example, representing all of the stereoisomeric species illustrated hereinabove.

The compounds of the present invention are active pharmacological agents, and they display hormonal and anti-hormonal properties which render them useful in hormonal therapy, and as adjuncts to hormonal therapy. For example, co-administered with the hormone cortisone, they inhibit certain of the undesirable side reactions of cortisone treatment. In particular, they inhibit the ability of cortisone to produce a decrease in lymph node weight. They are also anti-hypertensive agents which produce a fall in blood pressure of prolonged duration.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (°C.) and quantities of materials in parts by weight.

*Example 1*

Six parts of 3β-acetoxy-5,16-pregnadien-20-one is dissolved in a solution of approximately 4 parts of hydrogen sulfide in 150 parts of pyridine. Piperidine (0.5 part) is added and the reaction mixture is allowed to stand at about 25° C. for 20 hours. It is then diluted with 500 parts of ice water and extracted with a total of 350 parts of ether in several portions. The combined ethereal extract is washed with several small portions of water and concentrated to dryness. The residue can be purified by repeated crystallization from aqueous methanol, but purification is more easily achieved by chromatography on a silica gel column. For this purpose the residue is dissolved in a mixture of benzene and petroleum ether containing equal parts by volume of each solvent component, and the solution is poured on a chromatography column prepared from 200 parts of silica. After the column is washed with about 1800 parts of benzene, the desired product is obtained by eluting with a 5 volume percent solution of ethyl acetate in benzene. The residue obtained by elution with this solvent mixture is recrystallized from petroleum ether and then from methanol to yield 3β-acetoxy-20-oxo-5-pregnene-16-thiol which undergoes a transition point with fusion at about 148–150° C., then resolidifies and melts at about 157–160° C. This compound has the structural formula

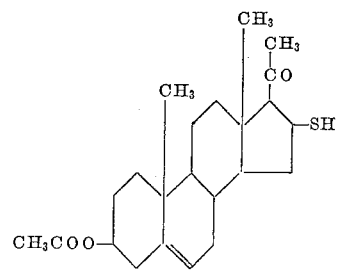

*Example 2*

A solution of 10 parts of 3β-hydroxy-5,16-pregnadien-20-one in 70 parts of pyridine and 20 parts of butyric anhydride is allowed to stand at about 25° C. for 24 hours. The unreacted butyric anhydride is hydrolyzed by slow dilution of the reaction mixture, and water is then added until precipitation of the insoluble reaction product is complete. The precipitated 3β-butyroxy-5,16-pregnadien-20-one is collected, washed and crystallized from aqueous ethanol. Substitution of 6.5 parts of this compound for the 3β-acetoxy-5,16-pregnadien-20-one in the procedure of Example 1 yields 3β-butyroxy-20-oxo-5-pregnene-16-thiol of the structural formula

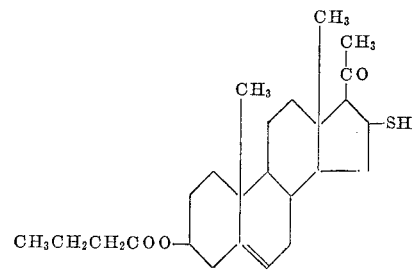

*Example 3*

A solution of 5.5 parts of 3β-acetoxy-20-oxo-5-pregnene-16-thiol, 55 parts of methanol, 10 parts of water and 3.8 parts of sodium hydroxide is allowed to stand at about 25° C. for 1 hour. A small amount of insoluble material is removed by filtration, and the filtrate is diluted with water and acidified with acetic acid. The precipitated product is collected on a filter and purified by successive crystallizations from aqueous ethanol, from petroleum ether containing a small amount of ether, and finally from aqueous methanol. There is thus obtained 3β-hydroxy-20-oxo-5-pregnene-16-thiol which melts at about 178–179° C. and has the structural formula

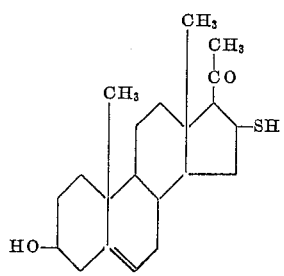

*Example 4*

A solution of aluminum isopropoxide is prepared by stirring 2.5 parts of this compound with 9 parts of toluene, and by decanting from a small amount of insoluble residue. A reaction mixture prepared from this solution of aluminum isopropoxide, 3.5 parts of 3β-hydroxy-20-oxo-5-pregnene-16-thiol, 220 parts of toluene, and 15 parts of cyclohexanone is heated under reflux for 20 minutes. There is then added to the cooled mixture 175 parts of benzene and 140 parts of ether followed by a solution of 40 parts of sodium potassium tartrate in 400 parts of water. After thorough mixing, and separation into phases, the organic solvent phase is washed with water, dried, and concentrated under reduced pressure. The residue is crystallized from a mixture of ether and petroleum ether to yield 3,20-dioxo-4-pregnene-16-thiol. An additional quantity of this product is obtained by evaporating the crystallization liquor, dissolving the residue in a mixture of benzene and petroleum ether containing equal parts by volume of each solvent component, and pouring the solution on a chromatography column prepared from 200 parts of silica. After washing the column with benzene and a small amount of a 2 volume percent solution of ethyl acetate in benzene, elution with a 5 or 10 volume percent solution of ethyl acetate in benzene affords the same 3,20-dioxo-4-pregnene-16-thiol that is obtained by direct crystallization of the crude reaction product. After crystallization from a mixture of ethyl acetate and petroleum ether, this compound melts at about 177–178° C. It has the structural formula

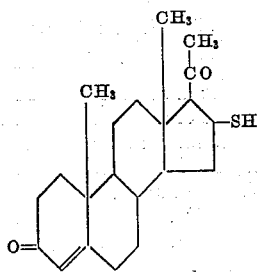

Example 5

A solution of 12 parts of 3β-acetoxy-5,16-pregnadien-20-one in 11 parts of thioacetic acid is irradiated with ultraviolet light for 2 hours, after which the solvent is removed by distillation under reduced pressure. The residue is triturated with ether and filtered, whereby there is recovered about 8.7 parts of a crude, solid product which consists substantially of a mixture of stereoisomeric 3β-acetoxy-16-acetylthio-5-pregnen-20-ones. By crystallization from a mixture of ethyl acetate and petroleum ether, followed by repeated crystallizations from methanol, there is obtained one purified isomer, stereoisomer B, which melts at about 168–169° C. and has a specific rotation of about −32° in chloroform solution.

Stereoisomers of this product are obtained by fractional crystallization or chromatographic separation of the residue obtained by evaporating the combined crystallization liquors. For example, the residue obtained by evaporation of the combined crystallization liquors is dissolved in a minimum quantity of benzene and poured on a chromatography column prepared with 50 parts of silica for each part of solid residue to be fractionated. After the column is washed with small portions of benzene, elution with a 2 volume percent solution of ethyl acetate in benzene (a 5 or 10 volume percent solution of ethyl acetate in benzene can be employed where it is desired to reduce solvent volumes) affords additional quantities of the isomer described hereinabove, as well as other stereoisomers. The first of the other stereoisomers to be eluted is 3β-acetoxy-16α-acetylthio-5-pregnen-20-one (stereoisomer A), which after crystallizations from methanol melts at about 186–187° C. and exhibits a specific rotation of about −53.5° in chloroform solution. Stereoisomer C, a highly levorotatory substance, is obtained by further elution of the chromatography column with the same solvent mixture. These stereoisomeric 3β-acetoxy-16-acetylthio-5-pregnen-20-ones have the structural formula

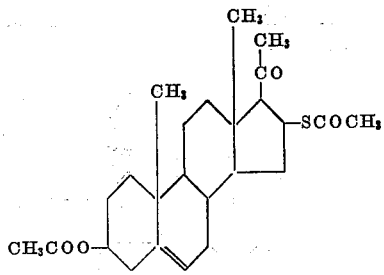

The reaction can also be carried out by allowing a solution of 1 part of 3β-acetoxy-5,16-pregnadien-20-one in 1 part of thioacetic acid to stand at about 25° C. in ordinary daylight for 4–5 minutes. The isolation of the reaction product and the separation of stereoisomers is then carried out as described hereinabove.

Example 6

A solution of 1 part of 3β-acetoxy-20-oxo-5-pregnene-16-thiol as obtained in Example 1, in 15 parts of pyridine and 15 parts of acetic anhydride is allowed to stand at about 25° C. for 24 hours. The reaction mixture is poured into water, and the crude, crystalline product is collected on a filter. By crystallization from a mixture of ethyl acetate and petroleum ether, there is obtained the purified compound, melting point about 186–187° C., identical with the 3β-acetoxy-16α-acetylthio-5-pregnen-20-one (stereoisomer A) of Example 5.

Example 7

One part of stereoisomer B, which melts at about 168–169° C. as obtained in Example 5, is added to a solution of 1 part of anhydrous sodium acetate in 10.5 parts of acetic acid, and the reaction mixture is heated under reflux for 4 hours. It is then cooled, diluted with 50 parts of water, and filtered. By crystallization of the solid product from a mixture of benzene and petroleum ether there is obtained the stereoisomeric compound which melts at about 186–187° C. and is the same as the 3β-acetoxy-16α-acetylthio-5-pregnen-20-one (stereoisomer A) described in Example 5.

Example 8

A solution of 2.6 parts of 3,20-dioxo-4-pregnene-16-thiol as obtained in Example 4 in 50 parts of pyridine and 50 parts of propionic anhydride is allowed to stand at about 25° C. for 24 hours. The unreacted propionic anhydride is hydrolyzed by cautious dilution of the reaction mixture, and water is then added until precipitation of the insoluble product is complete. This product is collected on a filter and purified by crystallization from a mixture of ethyl acetate and petroleum ether. The compound obtained is 16-propionylthio-4-pregnene-3,20-dione which melts at about 134–135° C. and has the structural formula

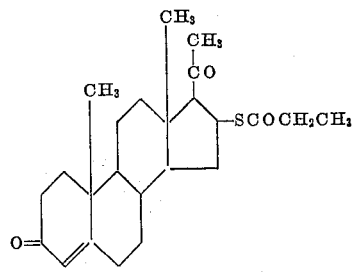

By the substitution of 50 parts of acetic anhydride for the propionic anhydride in the foregoing procedure, the compound obtained is 16-acetylthio-4-pregnene-3,20-dione.

What is claimed is:

1. A member of the group consisting of compounds of the structural formula

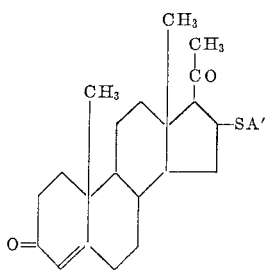

and compounds of the structural formula

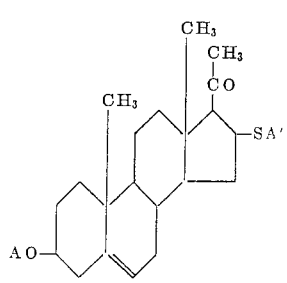

wherein A and A' are members of the group consisting of hydrogen and lower alkanoyl radicals.

2. A compound of the structural formula

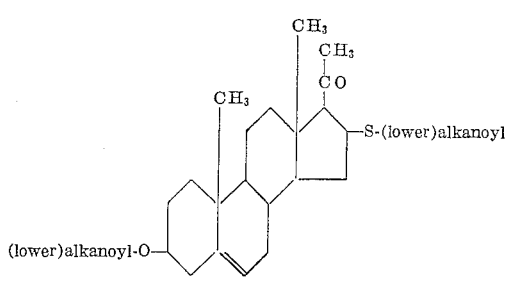

3. 3β-acetoxy-16-acetylthio-5-pregnen-20-one.

4. A compound of the structural formula

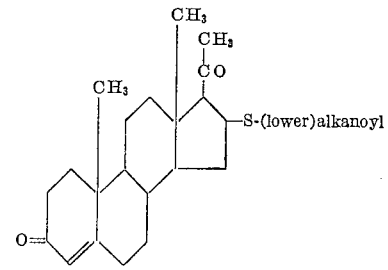

5. 3β-acetoxy-20-oxo-5-pregnene-16-thiol.
6. 3β-hydroxy-20-oxo-5-pregnene-16-thiol.
7. A compound of the structural formula 8. 3,20-dioxo-4-pregnene-16-thiol.

References Cited in the file of this patent
UNITED STATES PATENTS

| | | |
|---|---|---|
| 2,324,881 | Ruzicka | July 20, 1943 |
| 2,582,918 | Bernstein et al. | Jan. 15, 1952 |
| 2,697,108 | Rosenkranz et al. | Dec. 14, 1954 |
| 2,698,854 | Djerassi | Jan. 4, 1955 |
| 2,702,297 | Romo et al. | Feb. 15, 1955 |
| 2,708,201 | Dodson | May 10, 1955 |
| 2,752,369 | Holysz | June 26, 1956 |
| 2,756,179 | Fried | July 24, 1956 |
| 2,763,669 | Dodson et al. | Sept. 18, 1956 |
| 2,782,193 | Djerassi | Feb. 19, 1957 |
| 2,837,538 | Dodson et al. | June 3, 1958 |
| 2,859,222 | Dodson et al. | Nov. 4, 1958 |
| 2,875,215 | Dodson et al. | Feb. 24, 1959 |

OTHER REFERENCES

Fieser and Fieser: Organic Chemistry, page 139, 3rd edition, 1956, Reinhold Publishing Corporation.